United States Patent [19]

Yahraus

[11] 3,932,050

[45] Jan. 13, 1976

[54] JOINT STRUCTURE

[75] Inventor: Theodor G. Yahraus, Hendersonville, N.C.

[73] Assignee: General Electric Company, N.Y.

[22] Filed: Feb. 3, 1975

[21] Appl. No.: 546,806

[52] U.S. Cl. .................................... 403/11; 403/408
[51] Int. Cl.[2] ............................................ F16B 5/02
[58] Field of Search .............. 403/408, 11; 52/758 F

[56] References Cited

UNITED STATES PATENTS

| | | | |
|---|---|---|---|
| 1,946,931 | 2/1934 | Chong | 10/1 B |
| 3,155,771 | 11/1964 | Steger et al. | 151/41.75 X |
| 3,782,056 | 1/1974 | Osteen | 52/758 F |

*Primary Examiner*—Andrew V. Kundrat
*Attorney, Agent, or Firm*—Sidney Greenberg

[57] ABSTRACT

Joint formed by juxtaposed front and rear members fastened together by a self-drilling, self-tapping screw is provided with a slot in the front surface of the rear member. The slot provides space for receiving the chips produced by the drill end of the screw to avoid buildup of chips which might fall between and separate the joint members.

8 Claims, 5 Drawing Figures

2
3a
2c
3
1
1b
1c
3b

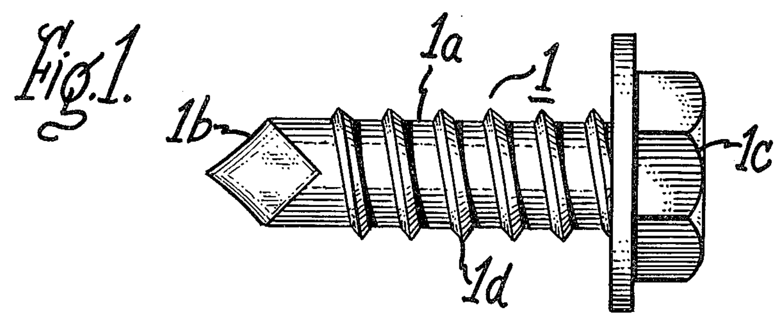
Fig.1.
1a
1
1b
1c
1d
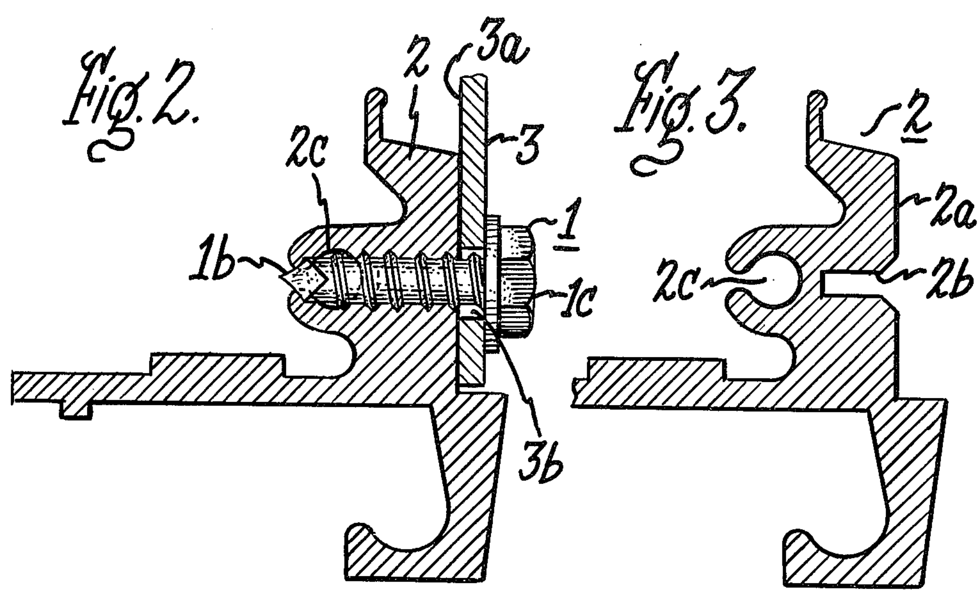
Fig.2.
2
3a
3
2c
1
1b
1c
3b
Fig.3.
2
2a
2c
2b
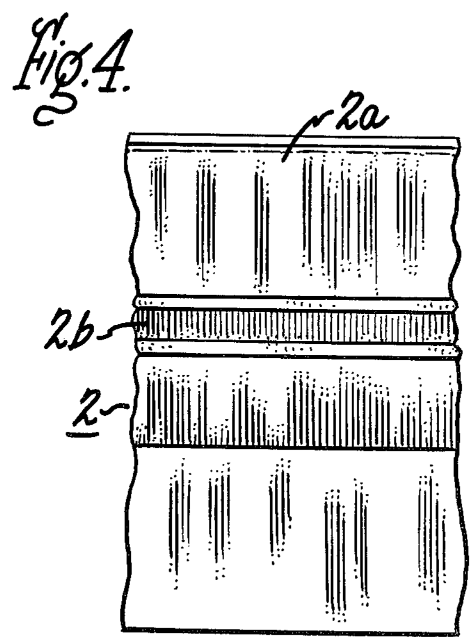
Fig.4.
2a
2b
2
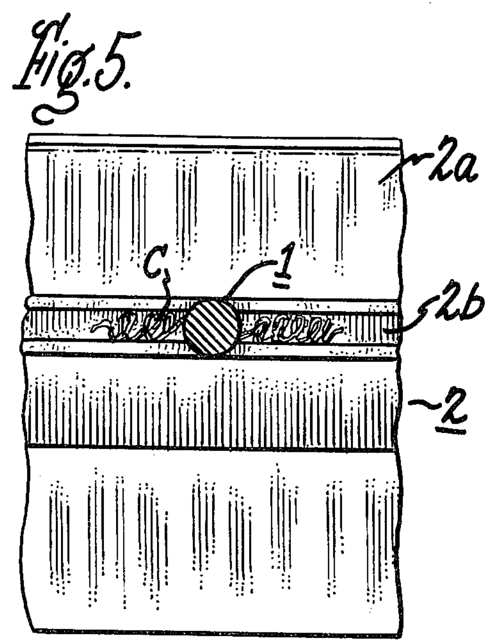
Fig.5.
2a
C
1
2b
2

JOINT STRUCTURE

The present invention relates to joint structures and particularly to a joint structure fastened by a self-drilling, self-tapping screw.

It is an object of the invention to provide for joint structures of the above type wherein the attachment of the self-drilling, self-tapping screw is facilitated and the engagement thereof with the joint members is improved.

It is a particular object of the invention to provide for joint structures of the above type wherein chips produced by the drill portion of the screw do not hinder operation of the screw or prevent tight mating engagement of the joint members.

Other objects and advantages will become apparent from the following description and the appended claims.

With the above objects in view, the present invention in one of its aspects relates to a joint structure comprising, in combination, first and second juxtaposed members having mating adjacent surfaces, and a screw passing through and fastening the juxtaposed members together, the screw comprising a shank having a head at one end adjacent the first member, a drilling portion at the other end, and a tapping portion between the head and the drilling portion, the screw extending through a hole in the second member formed by the drilling portion of the screw, the mating surface of the second member adjacent the first member being formed with an elongated recess intersecting the hole, the tapping portion of the screw being in threaded engagement with the second member adjacent the recess, whereby chips formed by action of the drilling portion of the screw collect in the elongated recess and the mating adjacent surfaces of the juxtaposed members are in close mating engagement.

The invention will be better understood from the following description taken in conjunction with the accompanying drawing, in which:

FIG. 1 is an elevational view of a self-drilling, self-tapping screw which may be employed in a joint structure embodying the invention;

FIG. 2 is a cross-sectional view of a joint structure embodying the invention;

FIG. 3 is a cross-sectional view of the rear joint member prior to assembly;

FIG. 4 is a front elevational view of the joint member shown in FIG. 3; and

FIG. 5 is a front elevational view of the rear joint member with screw attached showing collection of chips in the recess of the surface of that joint member.

Referring now to the drawing and particularly to FIG. 1, there is shown a self-drilling, self-tapping screw 1 of known type which may be used in the joint structure of the invention. Such screws have been extensively used heretofore for dispensing with the need to drill tap holes in metal members for the use of the screws therein. Screw 1 is formed with a shank 1*a*, drill portion 1*b* at one end, washer head 1*c* at the other end, and self-tapping helical threads 1*d* between the opposite ends of the screw.

FIG. 2 shows a joint structure which may be formed in accordance with the invention comprising a frame member 2, made for example of extruded aluminum, and a sheet metal member 3 fastened with adjacent surfaces in tight engagement by self-drilling screw 1. As seen in FIGS. 3 and 4, frame member 2 has a front surface 2*a* against which the rear surface 3*a* of sheet metal member 3 is pressed in the screw-fastened joint assembly. Member 3 has a hole 3*b* through which the shank of screw 1 passes and which is preferably oversized to avoid the necessity of drilling and tapping that member and the consequent production of metal chips and shavings which might fall between joint members 2 and 3. Channel 2*c* at the exit face of frame member 2 in the illustrated embodiment provides for insertion of screws at opposite ends to connect adjacent frame members together (not shown), and such a channel is not essential for the purposes of the present invention.

In accordance with the invention, an elongated slot or recess 2*b* is provided in the front surface 2*a* of frame member 2 into which self-drilling screw 1 is inserted in assembling the joint members. The entrance to slot 2*b* is beveled at top and bottom as shown. The depth of slot 2*b* is such that the remaining thickness of frame member 2 to be penetrated by screw 1 is less than the length of drilling portion 1*b* of the screw. The width of slot 2*b* is typically only slightly less than the diameter of the screw drilling portion, so that a minimum amount of metal is removed as that portion of screw 1 passes through slot 2*b* as it is rotated, and so that the threads of self-tapping screw portion 1*d* come into threaded engagement with the walls of slot 2*b* to thereby provide added thrust for drilling and firm anchoring of the screw in frame member 2. In the illustrated embodiment, the length of the tapping portion 1*d* is at least equal to the combined depth of slot 2*b* and the hole formed by drilling portion 1*b*.

In the fastening process, with sheet metal member 3 placed against front surface 2*a* of frame member 2, screw 1 is passed through clearance hole 3*b* of joint member 3 and is guided into slot 2*b* of frame member 2 by the beveled slot entrance. As the drill bit of screw 1 passes through the frame wall behind slot 2*b*, metal chips or shavings C are formed which are brought forward toward the entrance face of frame member 2 and collect in both directions in and along slot 2*b* on that surface, as seen in FIG. 5. As a result, the chips thus produced are not forced between the mating surfaces of the joint members and the possibility of sheet metal member 3 being outwardly displaced or separated from frame member 2 due to a buildup of the chips is entirely avoided.

In addition to the foregoing advantages, the provision of an elongated slot 2*b* as described and shown facilitates starting of screw 1 in the rear joint member, as well as locating and uniformly aligning the screws at the desired distance from the edge of the joint member to be engaged. Also, the provision of such a storage chamber for the chips produced during the fastening process avoids the possibility of the chips impeding the movement of the screw in that process or the action of the tapping portion of the screw.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Joint structure comprising, in combination, first and second juxtaposed members having mating adjacent surfaces, and a screw passing through and fastening said juxtaposed members together, said screw comprising a shank having a head at one end adjacent said first member, a drilling portion at the other end, and a tapping portion between said head and said drilling portion, said screw extending through a hole in said second member formed by said drilling portion of said screw, said mating surface of said second member adjacent said first member being formed with an elongated recess intersecting said hole, said tapping portion of said screw being in threaded engagement with said second member adjacent said recess, whereby chips formed by action of said drilling portion of said screw collect in said elongated recess and said mating adjacent surfaces of said juxtaposed members are in close mating engagement.

2. A device as defined in claim 1, the width of said recess being less than the outer diameter of said tapping portion of said screw.

3. A device as defined in claim 2, said first member having an aperture aligned with said hole through which said screw extends, the diameter of said aperture being smaller than the diameter of said screw head and larger than the diameter of the remainder of said screw.

4. A device as defined in claim 1, the edges of said mating surface at the entrance of said recess being beveled.

5. A device as defined in claim 1, the thickness of said second member at said hole being less than the length of said drilling portion of said screw.

6. A device as defined in claim 5, the depth of said recess being greater than the thickness of said second member at said hole.

7. A device as defined in claim 1, said recess extending a substantial distance along said second member on opposite sides of said hole.

8. A device as defined in claim 1, the length of said tapping portion of said screw being at least equal to the combined depth of said recess and said hole.

* * * * *